United States Patent
Kinoshita et al.

(10) Patent No.: US 6,908,596 B2
(45) Date of Patent: Jun. 21, 2005

(54) EXHAUST GAS PROCESSING SYSTEM

(76) Inventors: Yukio Kinoshita, 7-8, Mikanohara-cho 2-chome, Hitachi-shi, Ibaraki (JP), 316-0026; Kei Miwa, 68-24, Nishinosu Tainohama, Kitajima-cho, Itano-gun, Tokuyama (JP), 779-0100

( * ) Notice: Subject to any disclaimer, the term of this patent is extended or adjusted under 35 U.S.C. 154(b) by 265 days.

(21) Appl. No.: 10/086,887

(22) Filed: Mar. 4, 2002

(65) Prior Publication Data

US 2003/0031609 A1 Feb. 13, 2003

(51) Int. Cl.⁷ .............................. B01J 19/08; F23J 11/00
(52) U.S. Cl. ........................... 422/186.04; 422/186.05; 422/168
(58) Field of Search ....................... 422/186.04, 186.05, 422/168

(56) References Cited

U.S. PATENT DOCUMENTS 5,263,317 A  * 11/1993  Watanabe et al. ............. 60/275
5,576,970 A  * 11/1996  Goto ........................... 700/274
6,374,595 B1 *  4/2002  Penetrante et al. ........... 60/275

* cited by examiner

Primary Examiner—Steven Versteeg
(74) Attorney, Agent, or Firm—Antonelli, Terry, Stout & Kraus, LLP (57) ABSTRACT

Without of affect of sulfur in fuel, NOx in exhaust gas is decomposed completely using discharge and low temperature of 300 C. degree, to establish technique for generating $NO_2$ for necessary to oxidize a particle substance in a real time. The generated $NO_2$ and ozone and active oxygen generated in oxygen atmosphere are used an oxidation agent the particle substance is decomposed completely using discharge and low temperature of 300 C. degree. As to NOx in exhaust gas, No is decomposed completely using a thin and narrow wire shape bear wire and $NO_2$ for necessary to the particle substance is generated and is processed in response to operation condition of the engine in low temperature of 300 C. degree.

12 Claims, 10 Drawing Sheets

EXHAUST GAS PROCESSING SYSTEM

BACKGROUND OF THE INVENTION

1. <Technical Field>

The present invention relates to an exhaust gas processing apparatus in which a decomposition and a chemical reaction of a harmful chemical substance of an exhaust gas which is exhausted from a boiler, including Nox (nitrogen oxides), a particle substance and hydrocarbon, and from an engine, are promoted; and relates to a chemical work and an environment machine and apparatus.

2. <Prior Art>

Up to now, a processing technique having a low cost and for processing effectively NOx in an exhaust gas and fine particles in a harmful substance has not been established. As a removal technique for NOx, a denitration technology using ammonia is established for a fixed machine such as a boiler and an engine, but this technique has not been employed in a moving machine, such as an automobile, from an aspect of the safety.

For NOx removal from a diesel vehicle there has been performed a high pressure injection into the engine, and there has been a configuration of a combustion chamber, but with only this measure a satisfactory technology has not been established.

There is a device in which, as to NOx in an exhaust gas, a noble metal catalyst such as platinum is used, and using the catalyst in a post-process fine particles are decomposed, but NOx reduction effect has been as low as about 15% and a regular processing apparatus has not been established.

Further, there is a three way catalyst in which the noble metal is contained mainly, but this catalyst has a high cost and is not employed practically. In this, since the platinum used in the catalyst is lowered in catalyst function due to sulfur in the fuel, a low sulfur fuel is necessary.

On the other hand, as a removal technique for the fine particles, a technique, in which low temperature oxidation decomposition of $NO_2$ using a noble metal such as platinum has been established, but this technique has a high cost, and widespread use thereof has not been attained.

Now, a method for processing, in which, using a ceramic filter, the fine particles are adsorbed and after the adsorption this is processed with combustion, has been established. However, a batch processing and an alternative processing system in a plural processing system have been established, but since this has a high cost and disadvantages in use, the spread thereof has not occurred.

In the diesel engine, the components in the harmful substance in the exhaust gas can change to a great extent depending on the operating conditions, and the method in which all the present processing apparatuses are followed and an apparatus in which a decreased processing function is regenerated in a real time has not been realized.

It is established a technique wherein, without the effect of sulfur, , NO of NOx in an exhaust gas is decomposed completely and a necessary $NO_2$ for oxidizing the fine particles under a low temperature of about 300° C. is generated in a real time.

It is established a technique wherein generated $NO_2$ and the ozone generated in an oxygen atmosphere and an active oxygen are used as an oxidation agent, and a particle substance is decomposed under a low temperature of about 300° C. using completely a low catalyst.

It is established a technique wherein by following an operation condition of the engine, a processing is carried out in a real time.

It is established a technique wherein a construction having a low cost and a durability performance is attained.

It is established an apparatus in which an ammonia generation means is accompanied independently, and NOx (nitrogen oxides) is processed effectively.

It is established a technique using a generator system having a high heat resistance and a superior efficiency, wherein when an exhaust gas is processed according to a discharge and an electric application, an additional electric capacity is compensated and there is a compatibility with an already established generator.

SUMMARY OF THE INVENTION (1) As a solving measure for the technique wherein, without the effect of sulfur, NO of NOx in an exhaust gas is decomposed completely using a discharge, and a necessary $NO_2$ for oxidizing fine particles under a low temperature of about 300° C. is generated in a real time.

Firstly, as a means for carrying out the process without an effect of sulfur in the fuel, the generation of $NO_2$ is carried out not using platinum as the catalyst. Namely, a barrier discharge is used.

As a concrete example, to lower the voltage applied to the electrode as much as possible, one of the electrodes is formed with a long line shape, a belt shape, a rod shape, or a plate shape, and an outer skin of a superior permeability performance and thin insulation body, such as a ceramic and a heat-resistant silicone,. is used as a cover.

Another of the electrodes is formed with a bare wire suited to a shape of the insulation core wire, and is arranged along to the insulation core wire closely in a parallel shape, a rectangular shape, a spiral shape, a net shape, or a zigzag shape and then the ozone and the barrier discharge is generated effectively.

An alternating current high voltage is applied to the electrodes and the voltage and the frequency number are changed, in conformance with a rise in the voltage, NO in an exhaust gas containing residual oxygen is lowered and it has become zero when it reaches a same voltage.

On the other hand, $NO_2$ is increased gradually slightly (less than $\frac{1}{10}$) at first in comparison with NO, and $NO_2$ exists in a range from zero and has a peak value, and when the voltage is lowered further it is reduced gradually and becomes zero soon. At this point, NOx is gone out of existence completely.

In this case, the more an oxygen concentration and a hydrocarbon concentration is high, the more a range for vanishing completely NO and NOx occurs. Namely, it is possible to make the energy of NOx decomposition small and to carry out stable processing. By controlling the oxygen concentration and the hydrocarbon concentration, it is possible to obtain from a V curve, a reverse trapezoid curve having a long bottom face.

In the exhaust gas processing system, when the above stated concentrations are controlled, it is possible to carry out a further stable exhaust gas processing. Further, when the voltage is increased further, in some voltage NO is increased from zero and $NO_2$ is shifted to increase, and it is possible to obtain an increased characteristic.

By applying this phenomenon, in the range from NO being zero, it is possible to control in a moment of time a range from a peak value to zero according to a slight change of the voltage. By following the operation of the engine and by adjusting an amount of the particle, $NO_2$ necessary for converting to $NO_2$ is generated in a real time. This control is carried out in a small area and a high area of the discharge energy.

It is necessary to set a discharge element and a power supply means suited to the size of the engine, and the operation condition and a capacity of the means necessary to the control. When the barrier discharge in this example is used, in the discharge element of 80 cm, it is possible to process with a comparatively low voltage of 18 kHz and 6.5 kv, and a small consumption of electric power of from 10 W to 20 W.

Further, in a case of the spiral shape discharge wire, as shown in Table 1, there is a result that a winding pitch of about 10 mm is used for the most superior decomposition efficiency.

(2) As a solving measure of the technique wherein the generated $NO_2$ in the above stated item (1), and ozone generated in an oxygen atmosphere, and an active oxygen are used as oxidation agents, the particle substance is decomposed completely using a low cost catalyst under a low temperature about 300° C. Since the amount of $NO_2$ and the ozone (at more than 400° C., this has become the active oxygen) is controlled freely with the voltage, the frequency number and the oxides of vanadium and molybdenum, zeolite and alumina are used as the catalyst and under a low temperature about 300° C., and without use of noble metal, the particle substance is decomposed completely.

Further, using the nitric acid which is formed by the generated $NO_2$ and the water in the gas, and the sulfur oxide such as sulfuric acid which is formed by the oxidation of sulfur in the fuel, and without the catalyst, it is possible to decompose the particle substance and to control the generation amount of $NO_2$.

(3) A solving measure of the technique wherein by following the operation condition of the engine and in real time, using the $NO_2$ control technique stated in the above item (1), and by following the operation condition of the engine, the necessary $NO_2$ amount is calculated using a sensor and the operation characteristic is generated immediately, and then the particle substance is decomposed completely.

A particle substance sensor is arranged in an inlet port of the processing apparatus, the particle substance is sensed in real time, and the information thereof is inputted to a controller.

On the other hand, before and after a flow passage of the processing apparatus, an NOx sensor or $NO_2$ sensor is arranged, it is determined whether the concentration after the pass-through of the processing apparatus has been in an increase condition or in a decrease condition, and an $NO_2$ amount necessary for the complete decomposition of the particle substance is calculated according to NOx concentration and NO concentration after the processing.

The voltage value suited to the necessary energy is determined and the voltage is controlled in the real time, and as a result NOx and the particle substance are removed completely.

(4) A solving measure for attaining the above stated items (1)–(3) with low cost structure, wherein in the exhaust gas processing system according to the present invention, three large material elements in the cost aspect exist and these three material elements have been the discharge element, the low temperature catalyst, and the control means.

Firstly, as the discharge element, this element has been a simple structure in which around the thin and long discharge core wire the discharge wire is arranged with the spiral shape, for example. With the technique for manufacturing the optical fiber and the electric wire, the large amount discharge elements are manufactured simply and a discharge element having superior reliability is manufactured.

Next, as to the catalyst, as stated in the above stated item (2), basically without the use of the noble metal it is realized by the use of about 0.2% in the weight percentage and to the oxides of vanadium and molybdenum having the comparative low cost since the alumina and the zeolite are coexisted, compared with the conventional catalyst in which the noble metal is main, it is settled with the very low cost.

(5) As to the ammonia generation means for generating the ammonia independently and the construction for functioning the effective NOx processing, $N_2$ gas is obtained from the air and the moving vehicle has a hydrogen supply means generated in the fuel battery, and using the $N_2$ and the hydrogen the ammonia is generated, and it is possible to make harmless according to an NOx processing technique which is carried in the fixed means.

(6) When the exhaust gas is processed by employing the discharge and the electric power application, the additional electric capacity needed is achieved through the generator having the heat resistance performance, and superior efficiency is constructed to the system in which the compatibility is formed with the already established generator.

As to the above stated construction system, the inventor of the present invention has devised that using the generator having a low start activation torque, more than the high efficiency (95%), using slot insulation which permits increase in use temperature to 500° C. from the conventional temperature of 250° C., and using as the insulation portion of the covering of the coil the ceramic such as alumina, it is possible to realize the compatibility with the already established generator.

DESCRIPTION OF THE INVENTION

Figure 1A:
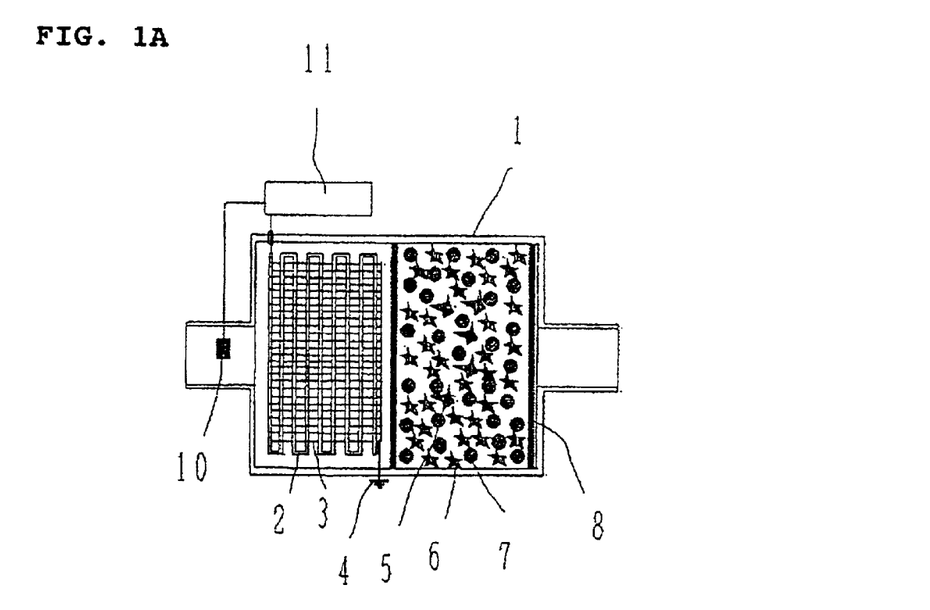
FIG. 1A is a cross-sectional explanatory view showing an exhaust gas processing apparatus in which the concentration of NOx is controlled by the high voltage discharge according to the present invention, and in the catalyst unit of the post-process the dynamic change in the engine can be followed.
Figure 1B:
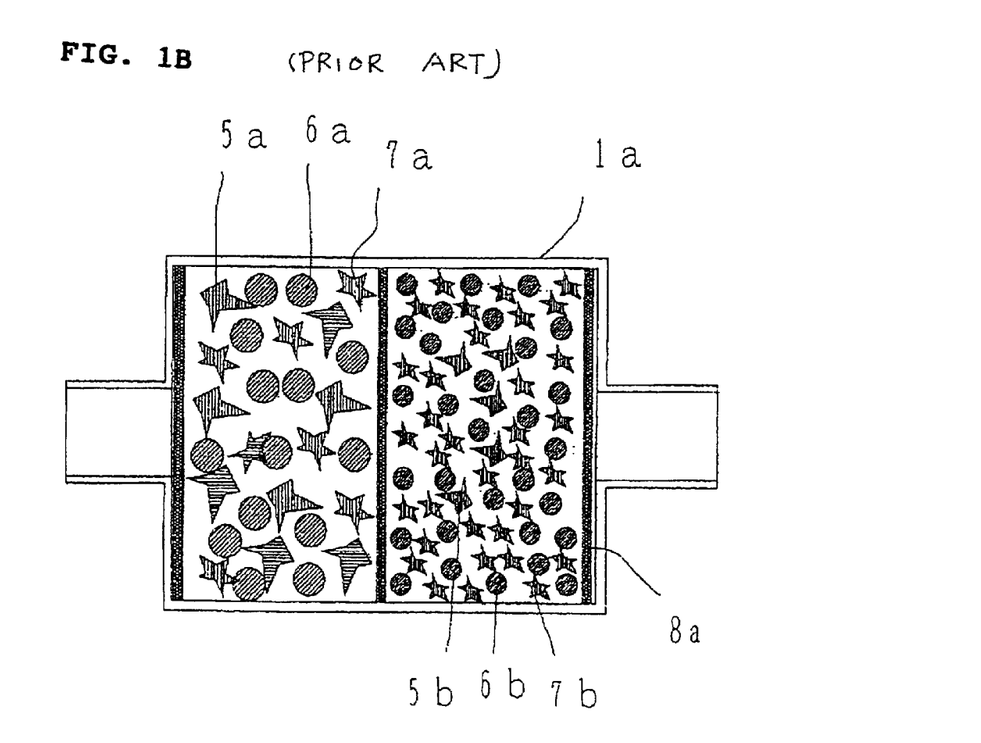
FIG. 1B is a cross-sectional explanatory view showing an exhaust gas processing apparatus according to the prior art in which in the prior stage and the after stage the catalyst using the noble metals are used.

Hereinafter, the examples of the carrying out embodiments according to the present invention will be explained referring to the drawings. FIG. 1A is an exhaust gas processing apparatus of one embodiment according to the present invention and FIG. 1B is an exhaust gas processing apparatus of one embodiment according to the prior art.

The features of the present invention are classified largely to two processing units, in a pre-process a processing according to a barrier discharge is carried out and in a post-process a processing using a catalyst is carried out.

In the barrier discharge, to a long and narrow single insulation core wire or plural insulation core wires 2 a bare discharge wires 3 is adhered closely on a surface of an insulation body and is netted with a spiral type and a cloth type as shown in an example and is gotten across all over a space.

An end portion of the discharge wires 3 is connected to a ground earth 4, and between the insulation core wire a barrier discharge is generated effectively according to a supply power control unit 11 in which a high frequency and high voltage generation means is installed in an interior portion.

In a high frequency and high voltage supply power using this means, the sine wave is formed to have a pulse shape, and the voltage may be formed the same from a power aspect and the voltage may be provided.

A sensor 10 detects the operation condition of an engine and detects directly the particle substance and NOx. A rotation number of the engine may be carried out using another means (not shown in the figure).

In this discharge unit, NOx exhausted from the engine, in particular NO and $NO_2$, is decomposed completely, and according to the changes of the voltage, the frequency number and the waveform, NO is decomposed completely and NOx is produced only and amount thereof is controlled.

It will be explained in FIG. 3 in a latter portion, for example, with a slight change of the voltage, the characteristic of NOx is changed largely to realize a very small electric energy use. Further, the structure of the discharge wire is constituted with a very simple electric wire and an optical fiber manufacturing technique, so that the manufacture thereof is attained with a high reliability and the cost has been very cheap.

In the present invention, $NO_2$ is generated by detecting the amount necessary for oxidizing the particle substance in the post-process using the oxidation property gas. As to this fact, the conventional apparatus has been no control function.

Namely, the discharge unit according to the present invention can determine exactly the condition of the engine and also the generation of the decomposition suited to Nox, in a real time.

In the conventional apparatus shown in FIG. 1B, since the large amount of platinum, being the noble metal, has been used as the catalyst, there is a high cost, and further according to the effect of the sulfur in the fuel the function is lowered.

Next, the catalyst processing unit in the post-process will be explained. In this unit, the catalyst in which mainly the particle substance is decomposed completely is used in the low temperature of about 300° C. For example, the comparatively low cost catalyst such as the oxide of vanadium 5 and the oxide of molybdenum 6 and alumina or the zeolite 7 is used, and $NO_2$ is worked effectively and then the substance is decomposed completely. These catalysts are realized almost with no use of the noble metal.

A reference numeral 1 is a frame of the machine and apparatus, and a reference numeral 8 is a partition wall having a superior permeability performance for holding the catalyst.

The conventional exhaust processing apparatus shown in FIG. 1B will be explained. In the pre-process, a large amount of platinum 5a, paradigm 6a and alumina 7 a is used, and NO in NOx is oxidized to $NO_2$, and in the catalyst in the post-process the particle shape substance is oxidized harmlessly. Since the noble metal is used, there is a high cost and there has not been widespread use thereof.

In this catalyst system, with respect to the operation of the engine, for example, by following the generation condition of the particle substance, it is impossible to carry out the processing and it is impossible to take the measure to the effect of and the deterioration due to sulfur.

The removal of NO is not carried out completely and NO of 85% is discharged from an exhaust port. This can be said that it has been the incompleteness apparatus. In the post-process, the noble metal is used mainly as the catalyst, and the platinum 5b, paradigm 6b and alumina 7b is used and the processing is carried out.

A reference numeral 1a is a frame of the machine and apparatus, and a reference numeral 8a is a partition wall having a superior permeability performance for holding the catalyst.

Figure 2A:
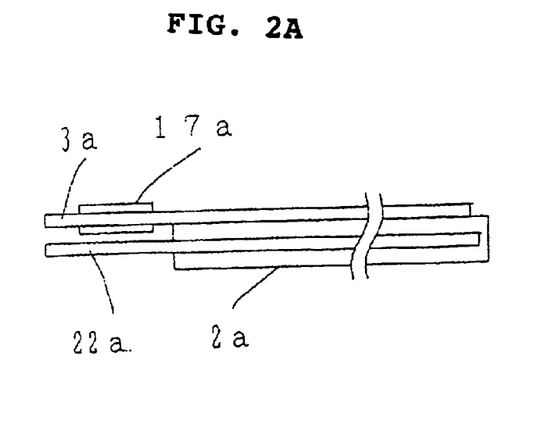
FIG. 2A and FIG. 2B are explanatory views each showing a discharge portion of a discharge wire in which an insulation core wire is arranged in parallel.
Figure 2B:
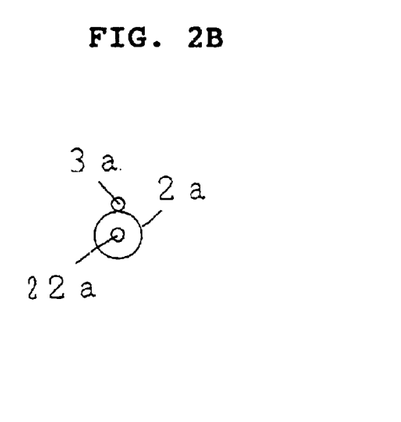

Figures from FIG. 2A to FIG. 2F will be explained. Herein, an example of the discharge wire structure being a base component of the present invention is shown. FIG. 2A and FIG. 2B show the long and narrow insulation core wire which is constituted by a core wire 22a and an insulation body 2a which is made of a material having a superior ductility performance and a thin and tough material such as a ceramic, and a heat- resistant silicone rubber which is covered as an outer skin of the core wire 22a.

An electrode is formed by the insulation core wire and a thin and bare discharge wire 3a having a diameter of from 0.2 mm to 0.3 mm which is arranged closely to this insulation core wire. An insulation body 17a is used for the electric isolation when the bare wire is drawn out to the outer portion of the apparatus and machine.

With the above stated simple structure, a manufacturing method having a high reliability performance, such as the electric wire and the optical fiber, is utilized, and it is possible to manufacture the discharge wire having the low cost and the high performance. This is the material having a superior ductility performance in which the zirconium is blended to the alumina and also having superior insulation performance.

Figure 2C:
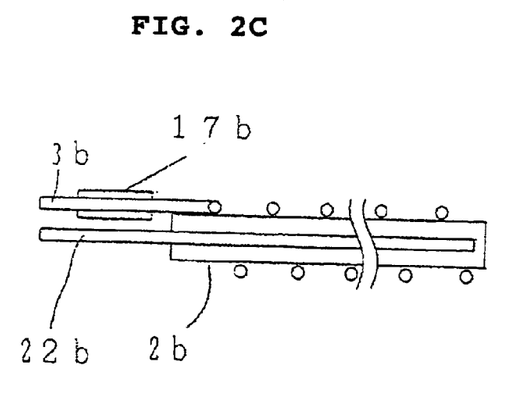
FIG. 2C and FIG. 2D are explanatory views each showing a discharge portion of a discharge wire in which an insulation core wire is arranged with a spiral shape.
Figure 2D:
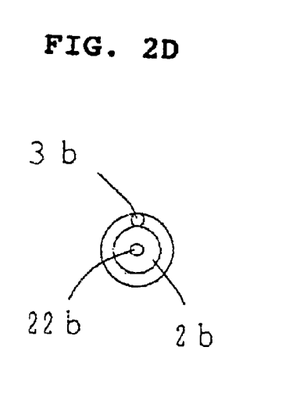

FIG. 2C and FIG. 2D show an example in which the discharge wire 3b is arranged with a spiral shape against the insulation core wires 2b and 22b. When a pitch of the spiral is changed, the decomposition performance of NOx is changed largely, and it is possible to manufacture the substances suited for the exhaust gas decomposition of the engine. A reference numeral 17b is an insulation body.

Figure 2E:
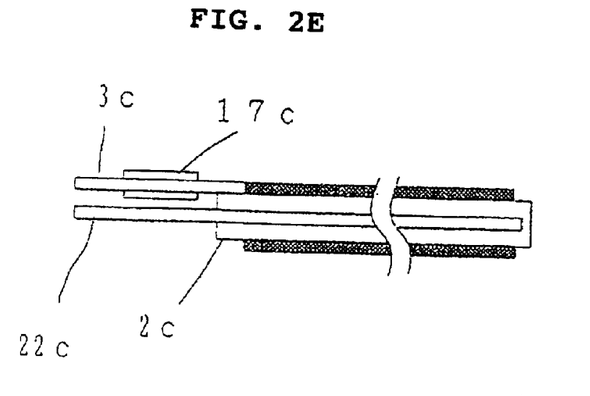
FIG. 2E and FIG. 2F are explanatory views each showing a discharge portion of a discharge wire in which an insulation core wire is arranged with a net shape.
Figure 2F:
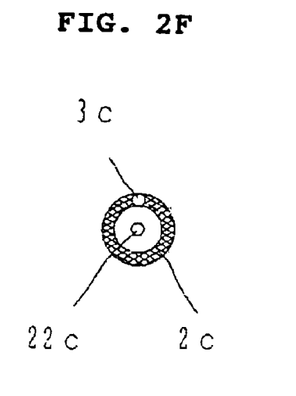

Next FIG. 2E and FIG. 2F will be explained. The discharge wire 3c is assembled with a net shape and to the insulation core wires 2c and 22c the discharge wire is arranged with a cylindrical shape. By the cylindrical discharge wire, the discharge wire has became strong and has a high durability performance, and further in addition to the conducting body, for example it is possible to use a net shape of the ceramic including the glass and the alumina. To this ceramic the catalyst is burdened and the ozone and the active oxygen are generated effectively. Further, in the same time of the $NO_2$ generation, the particle substance is decomposed and is processed all at once. As a result, the decomposition of the exhaust gas is carried out.

When a pitch of the spiral discharge wire is changed, the decomposition performance of NOx is changed largely and it is possible to manufacture the substance suited for the exhaust gas decomposition of the engine. The deterioration in the discharge wire is prevented, and taking into consideration the severe condition the superior durability performance is attained. A reference numeral 17c is an insulation body.

Further, it is possible to combine the plural discharge wires in parallel or crossing. It is possible to wind the discharge wire having plural pitches to the insulation wire and to connect the poles of the end portion or to separate. Then the discharge performance having the different characteristic is formed on the single discharge wire and the durability performance is improved several times.

Figure 3:
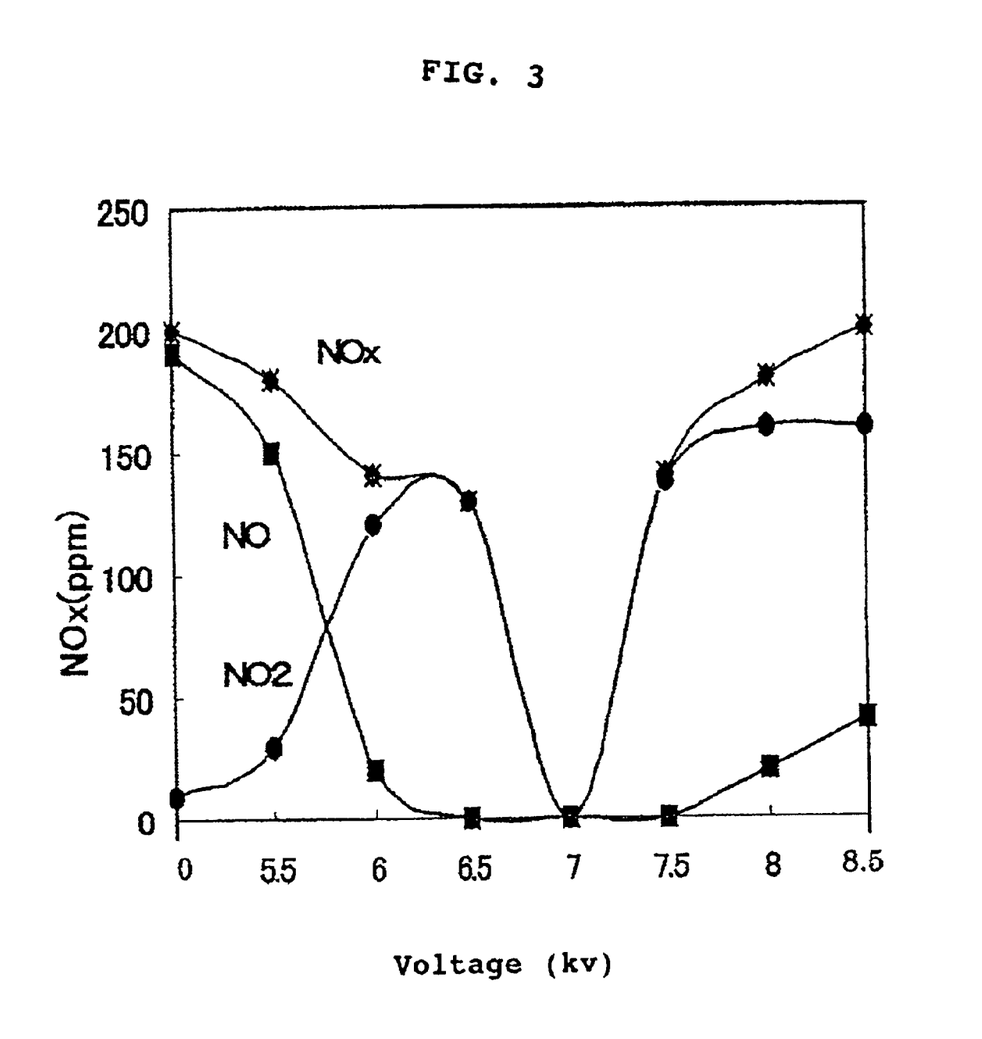
FIG. 3 is a NOx (NO, $NO_2$) reduction characteristic explanatory view of a spiral shape discharge portion according to the present invention.

FIG. 3 shows one example of the characteristic of the NOx decomposition of the spiral discharge wire against the alternating current application voltage. By the changes of the voltages, the condition of the changes of NOx, NO and $NO_2$ will be understood.

NO is reduced abruptly in company with the voltage rise and disappears completely in 6 kV and is continued zero (0) until 7.5 kV, and further when the voltage rises the concentration is increased gradually. When NO is zero (0) condition, NOx is presented only as $NO_2$ condition, and between from 6.5 kV to 7.5 kV, it is changed abruptly with a V shape between from 130 ppm to zero.

Accordingly, utilizing this characteristic, it is attained the complete processing of NO and is shown the possibility about the decomposition of the particle substance without the residual NOx. By adjusting the combustion condition of the engine and the boiler, the harmful exhaust gas has became completely the harmless one in the real time.

In the conventional apparatus and machine, it is impossible to carry out the adjustment, even though in some condition the most suitable characteristic may be obtained, but it is impossible to follow the concentration change of the harmful substance in the exhaust gas in accompaniment with the largely changed operation condition. Further, as to the characteristic deterioration in the use condition, no solving measure exists.

Figure 4A:
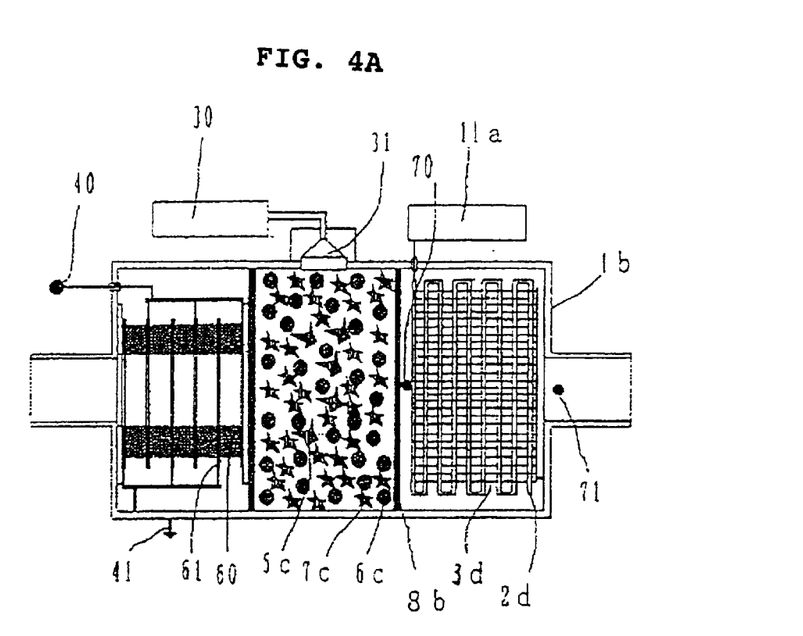
FIG. 4A is an explanatory view showing a general exhaust gas processing apparatus having a means for processing the particle substances employing a low voltage discharge, in an embodiment according to the present invention.

FIG. 4A shows the apparatus having the sensing function in which the particle substance is processed in the real time, and further the processing waste is monitored always and is processed using the plural adsorption faces of a ceramic filter 60.

Between the electrode plates 61 which are provided on both end faces of the ceramic filter 60, mainly the condition of the adhesion of the carbon system particle substance is determined, for example, according to the change in the electric resistance.

When the resistance value has became less than a predetermined value, the electric power is applied and then the particle substance is oxidized. The power supply for the electric supply has been very low voltage such as a several volts (V), and in the automobile there can be employed the power supply of the battery and the dynamo.

The processing of the particle substance is simple, and the particle substance is processed in the real time, and further there is a low cost and the system having the superior durability performance is constructed. To the ceramic filter the lower temperature catalyst for NOx decomposition is used, for example in which alumina, the oxides of gallium, tin, and indium are burdened, only in this process the harmful substance in the exhaust gas is processed.

Next, a catalyst processing unit in an intermediate process will be explained. This catalyst processing unit is constituted with NOx processing catalyst, and is constituted with the alumina 5c, oxides of gallium 6c, tin, and indium 7c. Also seen in FIG. 4A is partition wall 8b.

An ammonia generation means 30 is provided in an exterior portion, or in an interior portion and then an amount for necessarily processing for use is supplied from a nozzle 31. It is possible to employ the plasma technique and the high pressure synthesis technique.

As stated in above, the denitration system which has been established from the technical aspect in the present time can be formed. For the ammonia generation, hydrogen and nitrogen has been necessary, but hydrogen is made from the water such as the cooling water of the engine using the electrolytic process and nitrogen is taken from the air, in this time it is unnecessary to furnish the material supply.

Next, a final process in this figure is a discharge processing unit and this is mounted for the residual NOx processing and can be utilized as a part for the above stated ammonia generation.

A reference numeral 2d is an insulation core wire, a reference numeral 3d is a discharge wire, and a reference numeral 11a is a high voltage generating portion. A reference numeral 1b is a frame.

Reference numerals 70 and 71 are NOx sensor and $NO_2$ sensor and they are installed in a suitable position in before or after the processing of the NOx processing unit. They have sensed NOx processing conditions in the discharge unit, and adjust the voltage necessary to carry out NOx removal and the frequency number and further control the electric energy. A control method will be explained referring to FIG. 6.

Figure 4B:
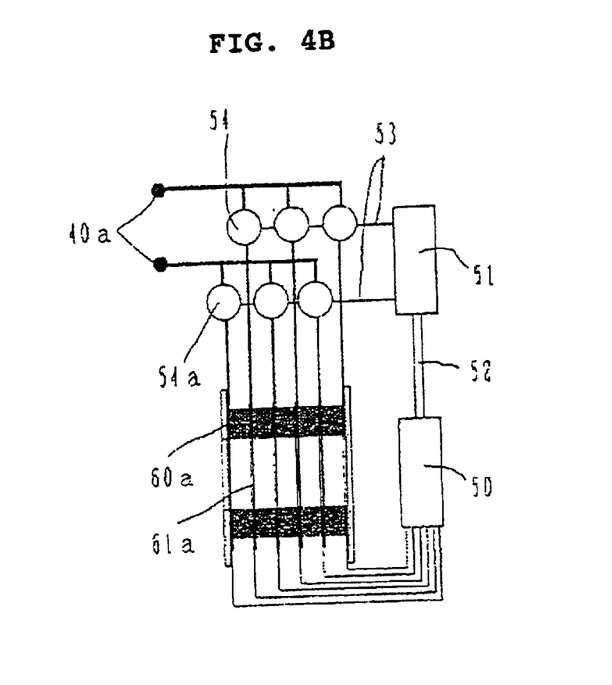
FIG. 4B is a selective and all-inclusive explanatory view showing an apparatus for processing particle substances employing a low voltage discharge according to the present invention.

FIG. 4B shows one example of a processing unit of the electric particle substance. In this figure, the resistance which is accompanied with the adhesion of the particle substances between the electrodes 61a which are provided in both ends of a ceramic filter 60a is processed by a sensor detection control portion 50, and between the electrodes necessary for particle substance processing the signal is sent to a burn-up processing control portion and is processed. Reference characters 51 and 52 respectively represent a switch change-over control means and connecting wiring.

Switch portions 54 and 54 a are opened or dosed by the signal line 53, and the unevenness of the particle substances due to the place is gotten rid of. The high performance particle substance processing apparatus having the self-help function and being low cost is provided. A reference numeral 40a is a power supply terminal.

FIG. 5 shows an explanation of an example in which when the diesel exhaust gas is decomposed with the high voltage discharge the decomposition of NOx is changed extremely according to the oxygen concentration in the gas.

Figure 5A:
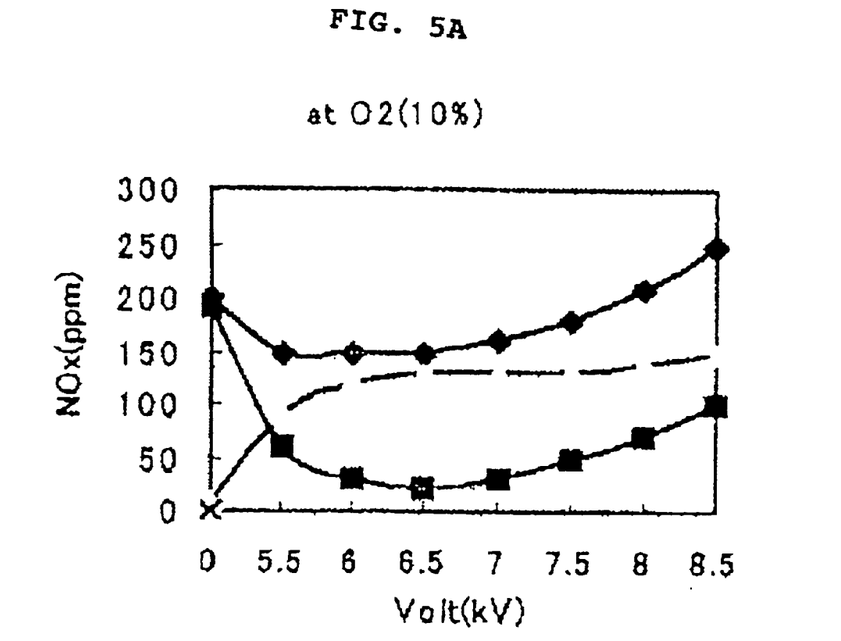
FIG. 5A is NOx reduction characteristic view according to a discharge in an oxygen concentration of 10% in the exhaust gas.

FIG. 5A shows a decomposition of the NOx (NO and $NO_2$) as a function of voltage, with an oxygen concentration in the exhaust gas of 10%, and accompanying a voltage increase NO is decomposed at first and in the vicinity of the voltage of 6.5 kV it is presented the lowest and more than this value it is increased gradually.

On the other hand, $NO_2$ is increased in an anti-proportion to the reduction of NO and is changed almost from the vicinity of 6–6.5 kV.

Figure 5B:
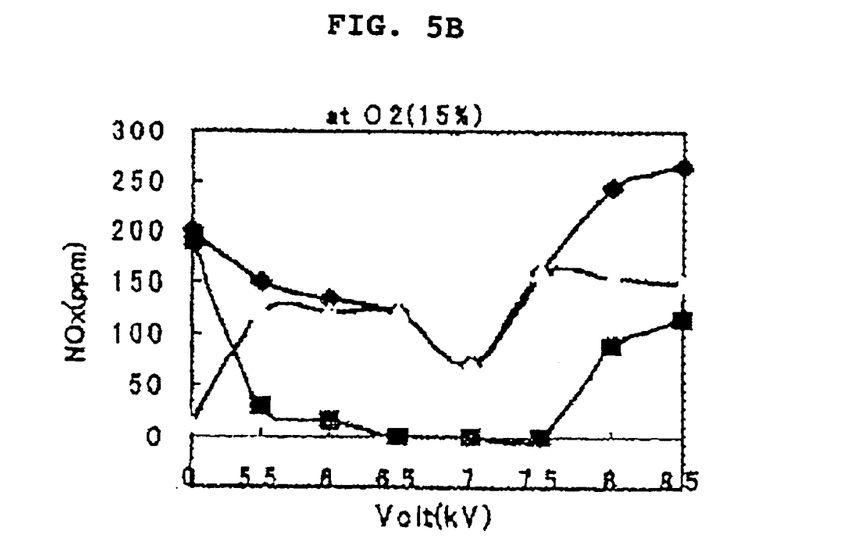
FIG. 5B is NOx reduction characteristic view according to a discharge in an oxygen concentration of 15% in the exhaust gas.

FIG. 5B shows a decomposition of the NOx (NO and $NO_2$) as a function of voltage, with an oxygen concentration in the exhaust gas of 15% and NO is decomposed and vanished until the vicinity of the voltage of 5.5 kV and in turn $NO_2$ is increased abruptly.

NO is vanished gradually from 5.5–6.5 kV and has became zero (0), and the zero (0) condition is continued to the voltage of 7.5 kV, and more than this the generation is caused again and accompanying the increase of the voltage it is increased.

On the other hand, $NO_2$ is increased slightly between the voltage of 5.5–6.5 kV, and after the high condition is continued and is reached to a peak, and after the voltage of 6.5 kV it is shifted to the reduction and in the vicinity of 7 kV it is shown the minimum value and after that is shifted to the increase. In the boundary of 7.5 kV accompanying the increase of NO it is shifted to reduce again.

Figure 5C:
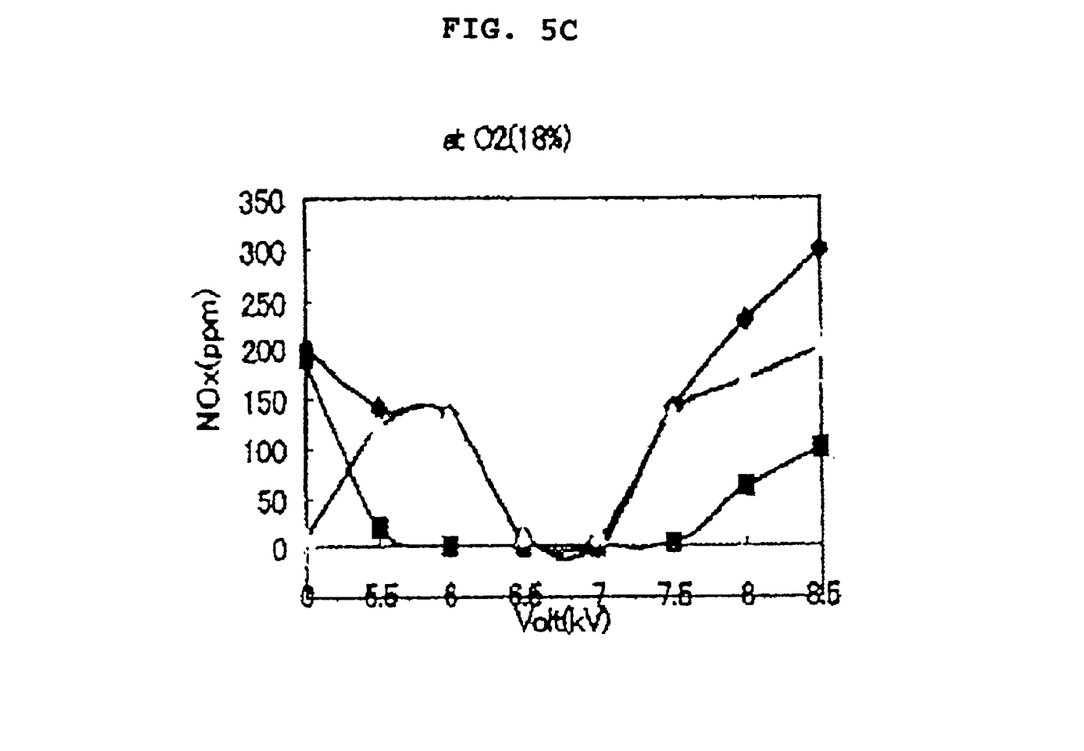
FIG. 5C is NOx reduction characteristic view according to a discharge in an oxygen concentration of 18% in the exhaust gas.

FIG. 5C shows a decomposition of the NOx (NO and $NO_2$) as a function of voltage, with an oxygen concentration in the exhaust gas of 18%, and NO and $NO_2$ vanish together and a V curve line is appeared extremely. Between the voltage of from 6.5 kV to 7 kV, it is possible to vanish completely.

A range of the complete vanish is spread from the voltage 5.6 kV to the voltage of 7.5 kV. Utilizing this characteristic it is possible to vanish completely NOx.

In this case, since the oxygen concentration in the exhaust gas exhausted from the diesel engine has been substantially 16%, by the provision of the oxygen supplying means in an outer portion or the system in the apparatus and machine, the effect means for reducing NOx is constructed.

Figure 5D:
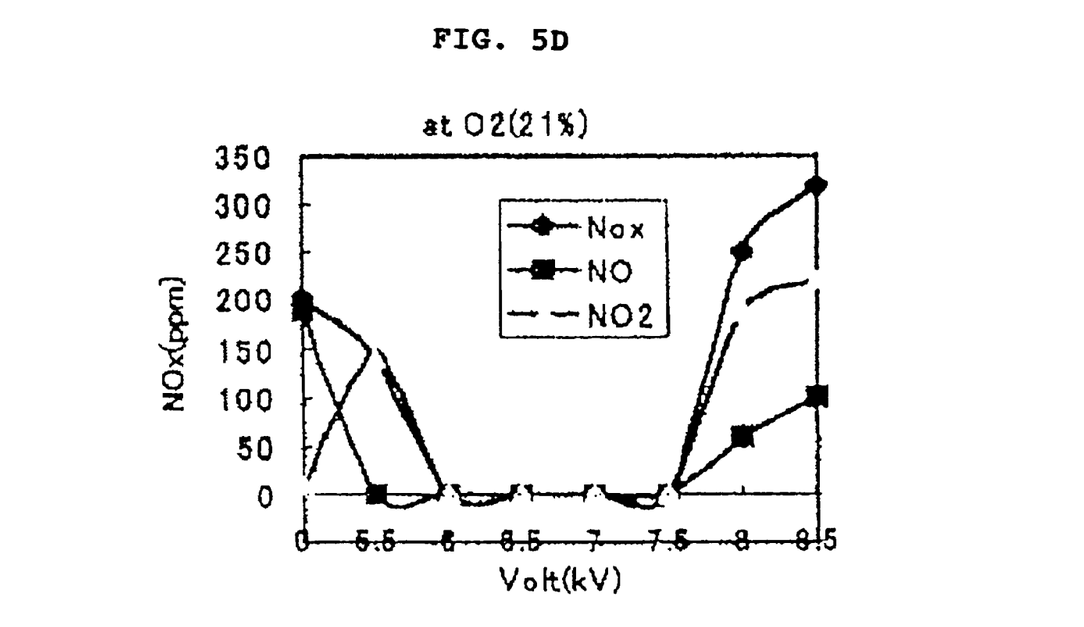
FIG. 5D is NOx reduction characteristic view according to a discharge in an oxygen concentration of 21% in the exhaust gas.

FIG. 5D shows a decomposition of the NOx (NO and $NO_2$) as a function of voltage, with an oxygen concentration in the exhaust gas of 21%, and NOx reduction characteristic is exhibited remarkably to that of the oxygen concentration of 18%.

As stated above, when the oxygen concentration in the exhaust gas is changed, it is possible to control easily the reduction of NOx. When the oxygen concentration is increased further, and the substance which is formed in the active oxygen condition and the ozone condition are supplied the reaction has become remarkable and the characteristic controls, and it is invited the energy saving effect and with the small energy the removal of NOx is attained.

Figure 6:
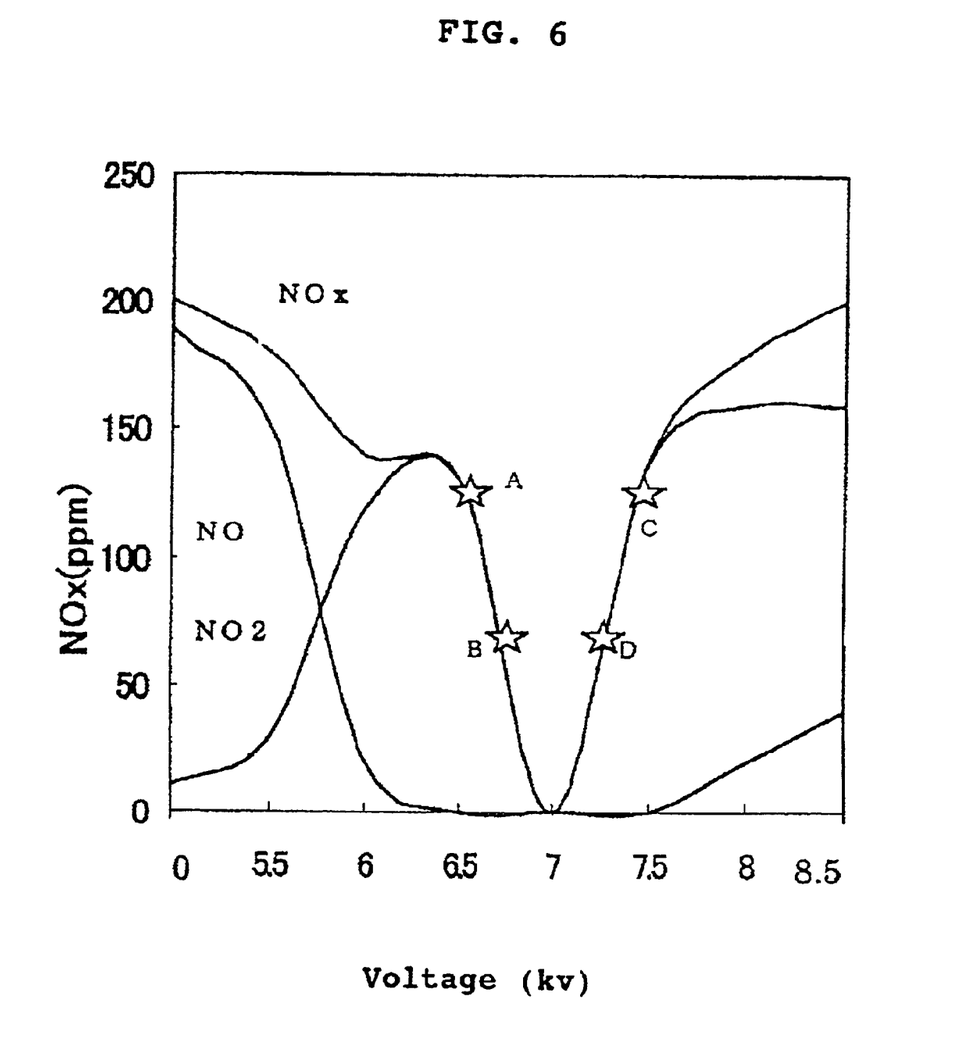
FIG. 6 is an explanatory view showing a sensing method in a case where the reduction of NOx is controlled.

FIG. 6 is an explanation view showing a control method for determining the energy necessary for NOx processing by determining the processing conditions in the NOx processing apparatus. The sensors are arranged in a suitable position before and after the flow passage of the discharge element in the NOx processing apparatus, and the processing condition of NOx is determined.

Namely, the reduction decay of NOx or the increase decay of NOx are caught by the two sensors, and, for example, when the reduction condition is presented from A point to B point, the energy is increased, and when from D point to C point it is changed, the energy is lowered, and as a result the control is carried out surely and NOx is completely removed. As occasion demands, the oxygen concentration adjustment apparatus in the system is tied up.

FIG. 7 shows an example of a new structure of the insulation discharge wire. In FIG. 7A, two discharge wires 3d and 3e which are arranged in parallel and separately are wound with a spiral shape and they are constituted by the insulation discharge wire.

Figure 7A:
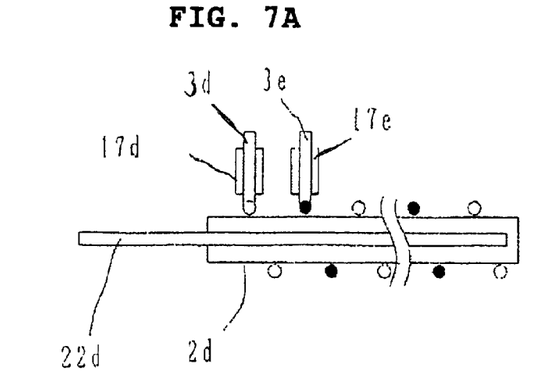
FIG. 7A is a structural explanatory view of a discharge wire in which plural wires are combined to maintain the performance of the discharge wire.

When the electric insulation in the space between the two discharge wires is lowered due to dirt and the water component of conductive substances such as the oxides of nitrogen and sulfur, the electric resistance between the two wires has became small and as a result the discharge performance is lowered remarkably.

This is that as if an insulation surface of the insulation body 2d which is formed by the alumina etc. containing the heat resistance basicity is presented to be covered with the integral conductive body and the discharge is not occurred easily. To prevent this, between the two discharge wires the voltage is applied and the electric power is applied and then using the heat or the discharge it is vaporized and is purified. This can be used as the dirty sensing sensor.

A reference numeral 22d is a conductive body of the insulation core wire and reference numerals 17d and 17e are insulation bodies of a lead wire portion of the discharge wire.

Figure 7B:
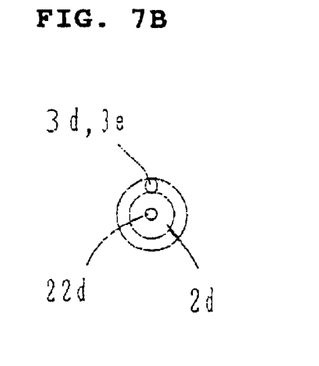
FIG. 7B is a side cross-sectional view of a discharge wire shown in FIG. 7A.

FIG. 7B shows a side cross-sectional view of the insulation discharge wire of FIG. 7A.

Figure 7C:
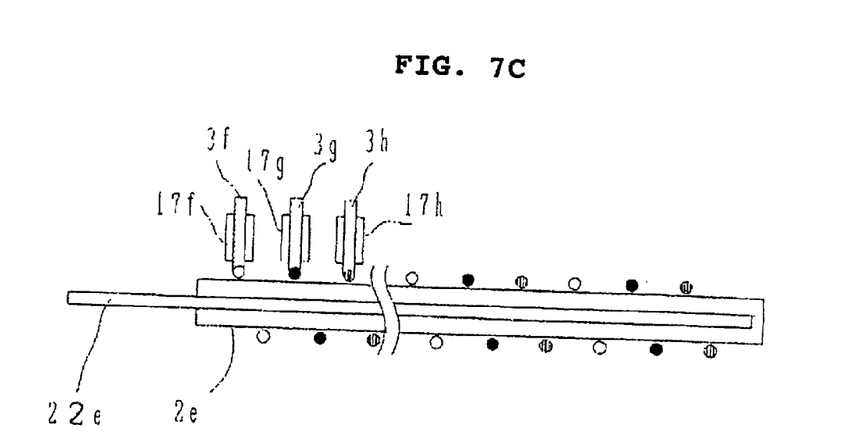
FIG. 7C is an explanatory view showing a method for changing the pitch in a case in which the discharge characteristic is changed.

FIG. 7C shows an example in which the insulation discharge wire is constituted by placing in parallel the discharge wires 3f, 3g and 3h and by winding with a spiral shape. The insulation and discharge wire is constituted with a core wire conductive body 22e, insulation body 2e, and a lead wire insulation bodies 17f, 17fg and 17h.

The discharge performance of this kind of discharge insulation wire differs extremely according to an arrangement pitch size of the discharge wire. In the insulation body having a discharge wire diameter of 0.3 mm, in a case of a pitch of 10 mm the most discharge characteristic is attained.

As shown in Table 1, the discharge characteristic is changed largely according to the pitch and the length, and it is changed less than ½. Using this phenomenon, the discharge characteristic is changed according to the combination of the discharge wires and the length of the tap. For example, the pitch is changed, the plural discharge wires are wound and the connection thereof and the combination are changed, and further making the same polarity and selecting them the discharge characteristic is changed.

Using the single discharge wire the supply energy is changed and discharge characteristic is changed. By combining the single discharge wire with these plural discharge wires, the control width of the exhaust gas processing machine is realized to have a further performance. Table 1

Conversion Rate (%) from No to $NO_2$ by Discharge Length L (mm) Electric Power P (W)

TABLE 1

Conversion Rate (%) from No to NO2 by Discharge Length L (mm) Electric Power P (W)

| Pitch (mm) | L = 250 P = 9 | L = 500 P = 18 | L = 750 P = 27 | L = 1000 P = 36 |
|---|---|---|---|---|
| 1 | 37 | 44 | 67 | 51 |
| 5 | 40 | 65 | 60 | 53 |
| 10 | 48 | 84 | 64 | 58 |
| 20 | 51 | 78 | 63 | 46 |

Figure 7D:
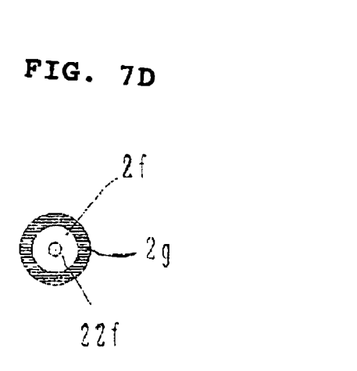
FIG. 7D is an explanatory view showing an example of an insulation structure of the insulation core wire.

FIG. 7D shows a cross-sectional view of the structure of the insulation body of the insulation core wire. A reference numeral 22f is a core conductive body and reference numerals 2f and 2g are insulation bodies. The insulation 2f is constituted with a substance in which to a substance an alumite processing is carried carries out with a net shape ceramic member and a space of this is buried with another insulation member and with a thin superior insulation performance.

Figure 7E:
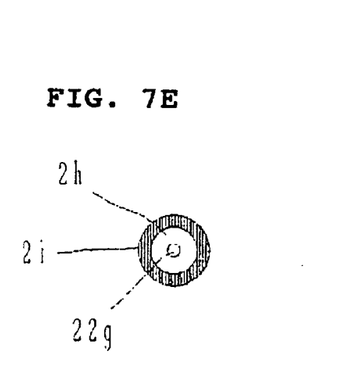
FIG. 7E is an explanatory view showing another example of an insulation structure of the insulation core wire.

FIG. 7E shows a cross-sectional view of the thin insulation core wire having the high performance in which to the insulation core wire using the nichrome wire 22g having the high heat resistance and the high strength material an outer skin of the core wire is provided in which the alumite processing is carried out after there has been formed a wire member, by covering the alumina 2h to the core wire and an outer portion insulation body 2i is covered.

Figure 8A:
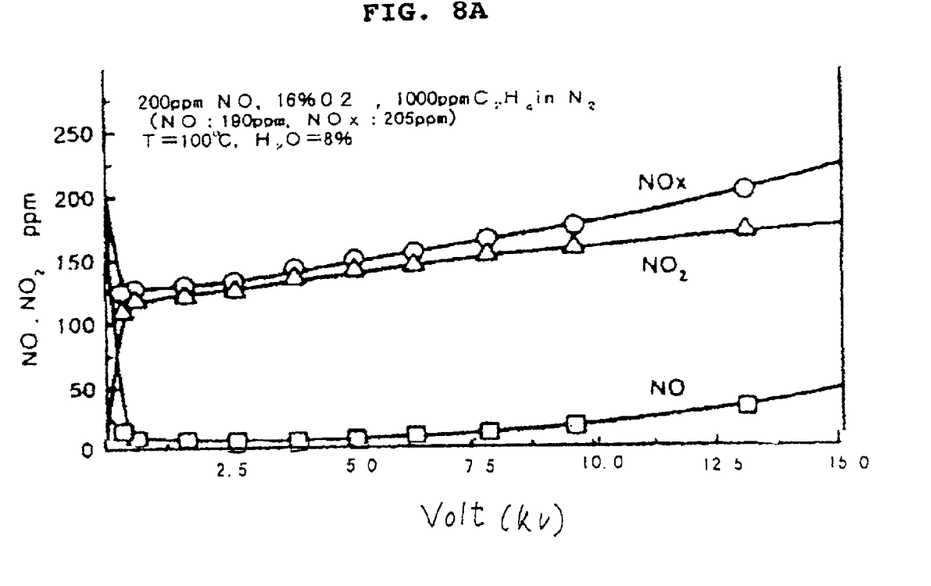
FIG. 8A is NOx reduction characteristic view showing a discharge in which an oxygen concentration is 10% and $C_2H_4$ concentration is 1000 ppm in the exhaust gas.
Figure 8B:
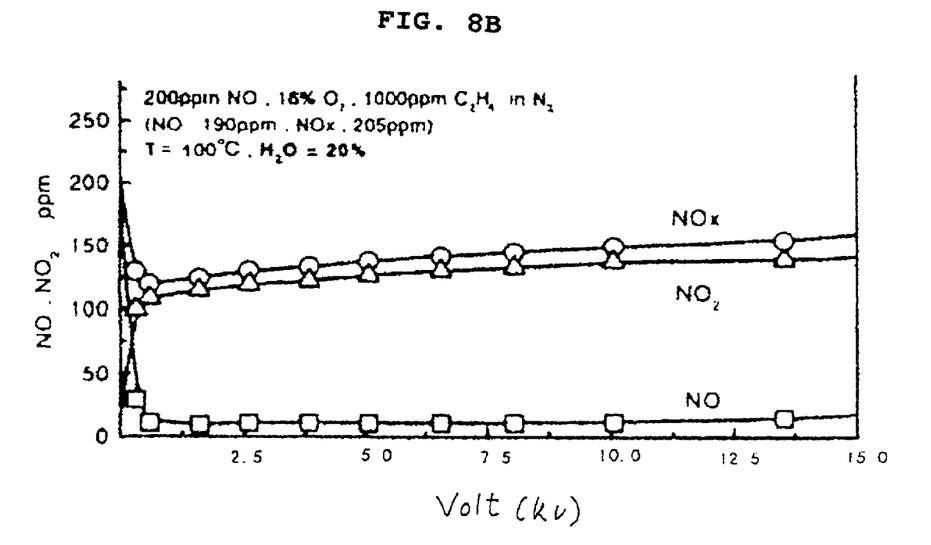
FIG. 8B is NOx reduction characteristic view showing a discharge in which an oxygen concentration is 21% and $C_2H_4$ concentration is 1000 ppm in the exhaust gas.

FIG. 8 is a graph showing the change of the characteristic in a case when the hydrocarbon is mixed with the exhaust gas. In a case where the oxygen concentration having the oxygen concentration 21% shown in FIG. 5D is mixed with the hydrocarbon having 1000 ppm, it can be admitted that the remarkable reduction of NOx is not appeared. This means that the generation of $NO_2$ is carried out stably. Namely, NO is converted to $NO_2$ and as the oxidizing agent it is utilized effectively for the oxidation and the removal of the particle substance.

Of course, the concentration of the oxygen and the concentration of the hydrocarbon are controlled organically and then the processing apparatus having the stable and high performance is realized.

FIG. 8A and FIG. 8B show NOx processing characteristics of the cases where the hydrocarbon of 1000 ppm and the oxygen concentration of 10% and the hydrocarbon of 1000 ppm and the oxygen concentration of 21% is mixed.

In this case, NOx is not removed completely but it is possible to remove NOx by combining the above stated technique shown in FIG. 5 in the final process of the processing apparatus.

Figure 9:
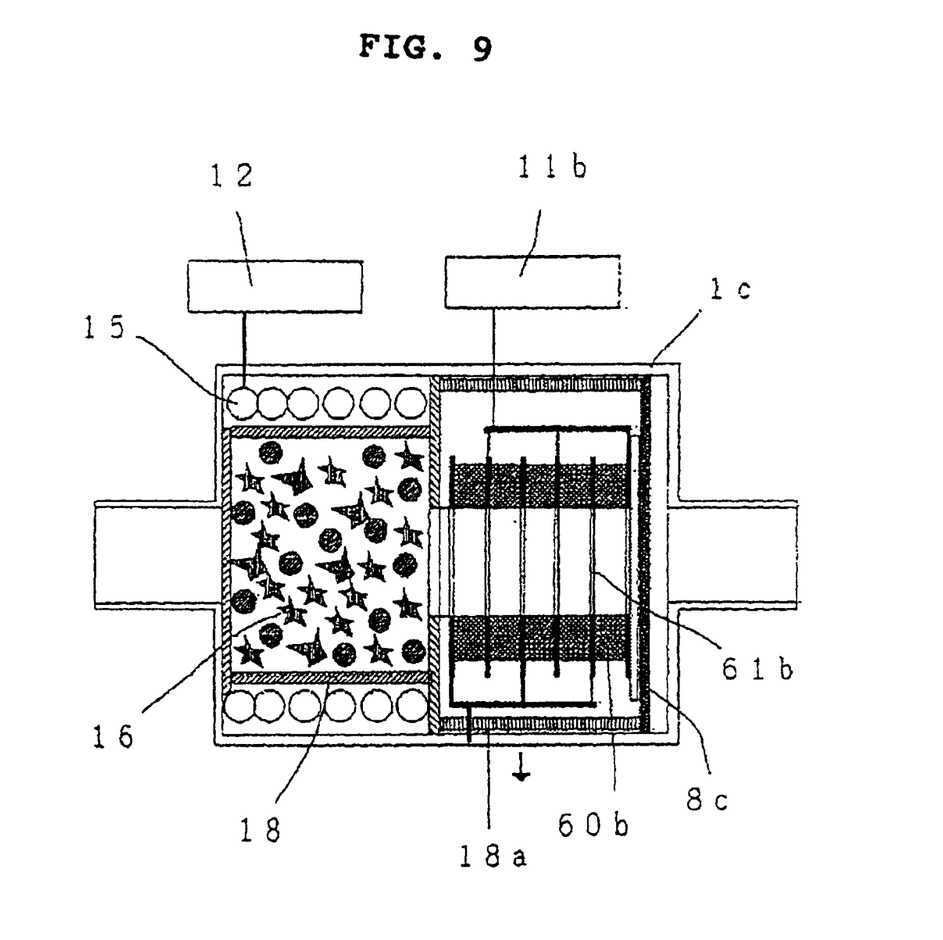
FIG. 9 is an explanation view showing an example of an exhaust processing machine in which the heat retaining and the combustion reaction are carried out effectively.

FIG. 9 shows exhaust gas apparatus in which, to reserve and not to release the heat amount generated during the ozone generation and the corona generation according to the heat generation and the discharge when the particle substance is applied with the electric power and is burned up, an adiabatic structure is made, with the ceramic to the outer portion of the apparatus, and with the inner portion of the apparatus being maintained with as high a temperature as possible, it is possible to carry out the reaction and the decomposition with the small energy addition.

Further, a preheat portion is arranged at a vicinity of the engine exhaust port and the combustion temperature of the particle substance is reached to 650° C. as possible and then the reaction promotion and the energy saving is attained.

In FIG. 9, the following reference characters represent the following structure:

(a) Reference character 12 represents an induction heating wire;

(b) Reference character 15 represents an induction heating coil;

(c) Reference character 11b represents a low-voltage power supply;

(d) Reference character 1c represents a frame;

(e) Reference character 61b represents a ceramic filter;

(f) Reference character 8c represents an isolation wall;

(g) Reference character 60b represents a ceramic filter;

(h) Reference character 18a represents a thermal insulation member;

(i) Reference character 18 represents a thermal insulation member; and (j) Reference character 16 represents a magnetic body.

The above stated exhaust gas processing apparatus is a comparatively simple structure in comparison with that of the prior art apparatus, and has been the epoch-making gas processing technique which permits the harmless performance of the harmful exhaust gas by following the operation condition of the engine etc., and is utilized in all fields relating to the decomposition of the gas and the reaction.

This apparatus is utilized effectively to the pollution measure of the automobile, the boiler and the engine and the chemical reaction promotion, the combustion promotion, and the decomposition of the harmful substance.

Further, the discharge portion can be manufactured from the advanced production techniques of the wire and the optical fiber, and accordingly the ozone generation apparatus having the high quality, the superior production performance, and the simple structure and the low cost for the corona generating apparatus can be provided.

Further, the electric applying and burn-up apparatus having the low voltage and the very low cost can be applied to the adsorption and decomposition apparatus having combustible substances.

Further, the electric supply and burning-up apparatus having the ammonia is generated independently and when an NOx denitration system is used in the installation type film.

The effects according to the present invention have the excellent effects as the exhaust gas post-processing apparatus such as the automobile and the boiler, in which the performance, the cost performance and the maintenance performance can be solved at a stroke. The main effects are as following:

1. With the simple discharge wire structure, NOx (NO and $NO_2$) is decomposed completely, the generation amount of $NO_2$ for oxidizing and decomposing the particle substance is controlled freely under the zero condition of NO, and it is followed completely to the decomposition of the particle substance in the exhaust gas.

The catalyst used in this case is not the noble metal, and NO is oxidized under the low temperature of 300° C. and is exhausted with the harmless carbon dioxide.

2. The particle substance is adsorbed to the ceramic filter and the portion necessary for the burning up of the adsorption face is detected by the plural electrodes, and with the power supply of the low voltage the particle substance is burned up selectively and electrically and is formed as the carbon dioxide and is formed as the harmless substance.

Accordingly, the apparatus and machine for processing in the on-board real time and having superior maintenance performance is realized.

Further, by the employment of the catalyst, in which is the noble metal is substantially not used, and has the low cost performance, NOx is decomposed and by provision of the ammonia generation apparatus independently and by the combination of the superior denitration apparatus, the exhaust gas processing apparatus having the high performance and the low cost structure and the superior maintenance performance is provided.

3. The exhaust gas processing element is constituted with the alumina containing zirconium having the high reliability as the discharge portion and has the wire shape and is simple and strong by forming thin the insulation coating. The discharge wire is formed of the conductive body itself, and the ceramic wire and the plural discharge wires are formed with the net structure and then the discharge characteristic and the strength performance and the durability performance are increased.

By burdening the catalyst to the ceramic wire and the catalyst action occurs, accordingly the excellent exhaust gas processing element having the high efficiency and the low cost performance is provided.

what is claimed is:

1. An exhaust gas processing apparatus having (1) a discharge generation means and (2) a catalyst downstream of the discharge generation means, wherein:

said discharge generation means comprises: an insulation body, one electrode covered by an outer skin of said insulation body, and another electrode formed with a bare wire, said another electrode being arranged adjacent to the insulation body, along the insulation body;

in processing of an exhaust gas including particle substances from a diesel engine, by use of the catalyst combined with the discharge generation means and in response to conditions of the exhaust gas, NO and $NO_2$ can be removed, and an amount and a component of nitrogen oxides of a generation necessary for processing said particle substances can be controlled, whereby using said catalyst said particle substances can be removed under a low temperature of about 300° C.

2. An exhaust gas processing apparatus according to claim 1, wherein said catalyst is selected from the group consisting of vanadium oxide, molybdenum oxide, alumina and zeolite.

3. An exhaust gas processing apparatus according to claim 1, wherein said discharge generation means is in a first section of said exhaust gas processing apparatus and said catalyst is in a second section of the exhaust gas processing apparatus, said second section being downstream of the first section.

4. An exhaust gas processing apparatus according to claim 1, further comprising a source of alternating current high voltage, connected to the one and another electrodes so as to apply an alternating current high voltage thereto.

5. An exhaust gas processing apparatus according to claim 4, further comprising a controller that controls voltage output of the source of alternating current high voltage, said voltage output being applied to the one and another electrodes of the discharge generation means.

6. An exhaust gas processing apparatus according to claim 5, further comprising a sensor located at an input to the exhaust gas processing apparatus, for sensing the particle substances and sending a sensed value to the controller.

7. An exhaust gas processing apparatus according to claim 1, further comprising a gas supply conduit for supplying the exhaust gas including the particle substances from the diesel engine to the discharge generation means of the exhaust gas processing apparatus.

8. An exhaust gas processing apparatus according to claim 1, wherein said another electrode is wound around the insulation body, having a spiral shape.

9. An exhaust gas processing apparatus having (1) a discharge generation means and (2) a catalyst downstream of the discharge generation means, wherein:

said discharge generation means comprises: an insulation body, one electrode covered by an outer skin of said insulation body, and another electrode formed with a bare wire, said another electrode being arranged adjacent to the insulation body, along the insulation body;

in processing of an exhaust gas including particle substances from a diesel engine, by use of the catalyst combined with the discharge generation means and in response to conditions of the exhaust gas, NO and $NO_2$ can be removed, and an amount and a component of nitrogen oxides of a generation necessary for processing said particle substances can be controlled, and further wherein:

the exhaust gas processing apparatus comprises further an ammonia high pressure reaction means or a plasma synthesis means, and a necessary amount of ammonia is generated, whereby using said catalyst said particle substances can be removed under a low temperature of about 300° C.

10. An exhaust gas processing apparatus according to claim 9, further comprising a source of alternating current high voltage, connected to the one and another electrodes so as to apply an alternating current high voltage thereto.

11. An exhaust gas processing apparatus according to claim 10, further comprising a controller that controls voltage output of the source of alternating current high voltage, said voltage output being applied to the one and another electrodes of the discharge generation means.

12. An exhaust gas processing apparatus according to claim 11, further comprising a sensor located at an input to the exhaust gas processing apparatus, for sensing the particle substances and sending a sensed value to the controller.

* * * * *